(No Model.)
C. A. BIORN.
MUCILAGE BOTTLE.
No. 573,129. Patented Dec. 15, 1896.
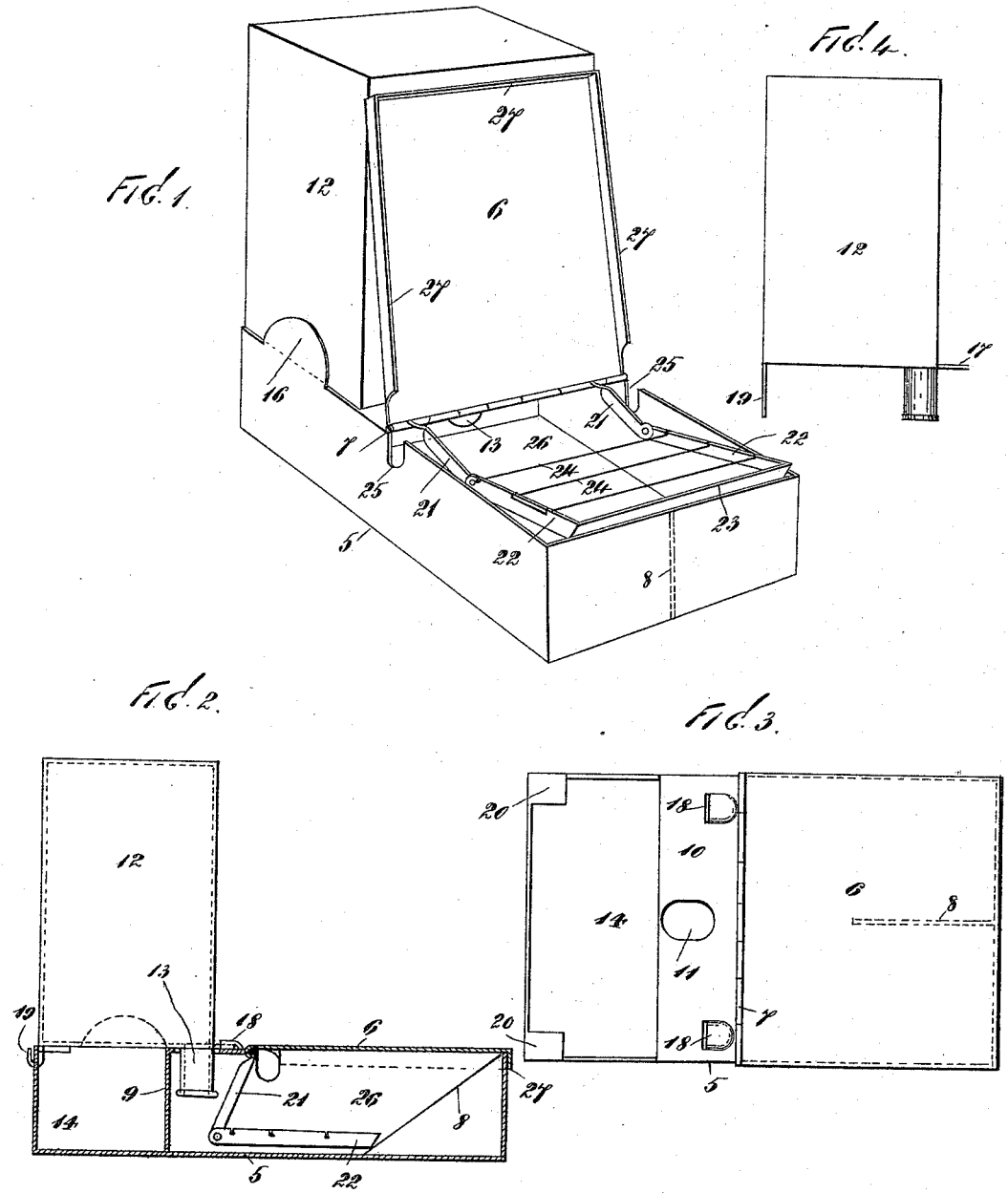
WITNESSES
INVENTOR
Christian A. Biorn
BY
Edgar Tate
ATTORNEYS.

UNITED STATES PATENT OFFICE.

CHRISTIAN ALETH BIORN, OF PIERMONT, NEW YORK, ASSIGNOR OF ONE-HALF TO JOHN M. JONES, OF SAME PLACE.

MUCILAGE-BOTTLE.

SPECIFICATION forming part of Letters Patent No. 573,129, dated December 15, 1896.

Application filed August 22, 1896. Serial No. 603,596. (No model.)

*To all whom it may concern:*

Be it known that I, CHRISTIAN ALETH BIORN, a citizen of the United States, and a resident of Piermont, in the county of Rockland and State of New York, have invented certain new and useful Improvements in Mucilage-Bottles, of which the following is a specification, reference being had to the accompanying drawings, forming a part thereof, in which similar numerals of reference indicate corresponding parts wherever found throughout the several views.

This invention relates to mucilage stands or receptacles, and the object thereof is to provide an improved device of this class which is of the fountain order and which is simple in construction and operation and provided with means for removing the surplus mucilage from the brush and which will not become clogged or useless by reason of the mucilage drying thereon or therein.

The invention is fully disclosed in the following specification, of which the accompanying drawings form a part, in which—

Figure 1 is a perspective view of my improved mucilage-bottle; Fig. 2, a partial longitudinal section thereof; Fig. 3, a partial plan view thereof, and Fig. 4 a side view of the mucilage receptacle or reservoir proper.

My improved mucilage receptacle or vessel is preferably composed of sheet metal, and in the practice of my invention I provide an oblong rectangular box or casing 5, which is of the required depth and centrally of the top of which is hinged a cover 6, the hinge of the cover being shown at 7, and said hinge being of any desired form, and the front of said box or casing is provided with a backwardly and downwardly inclined longitudinal plate 8, and the rear portion thereof is also cut off or separated from the body portion by a vertical partition 9, and back of the hinged cover 6 is a transverse top plate 10, centrally of which is formed an opening 11. I also employ a vessel 12, which is preferably rectangular in form, as shown in Figs. 1 and 2, and which is adapted to be placed over the rear portion of the box or casing 5, as shown in said figure, and said vessel is provided with a neck 13 at the lower end thereof, which passes through the opening 11 in the plate 10, and the chamber 14, formed by the partition-plate 9, is open at the top, and said vessel 12 when in position forms a cover therefor, and the sides of the box or casing 5 are provided with upwardly-directed wings 16, which assist in holding the vessel 12 in place, and said vessel 12 is provided at the bottom of its front side with suitable projections 17, which are adapted to be inserted into keepers 18, formed on or secured to the plate 10, and at the bottom of its rear side with flexible projecting strips 19, which are adapted to be inserted through corresponding openings formed in the rear end of the box or casing 5, and the corners of the rear end of the box or casing are provided with inwardly-directed plates 20, which serve as additional supports for the mucilage receptacle or reservoir 12 when the latter is placed in position.

Connected with the hinge of the cover 6 are downwardly and backwardly directed arms 21, the lower ends of which are pivotally connected with a brush-cleaning frame which fits within the forward portion of the box or casing 5 and which is composed of side bars or plates 22 and a front cross bar or plate 23, and the side bars or plates 22 are connected by wires 24, which are arranged transversely of said frame.

When the cover 6 is closed, the frame connected with the arms 21 occupies the position shown in Fig. 2 and rests at the bottom of the box or casing 5, and when the cover 6 is raised, as shown in Fig. 1, said frame is projected forward and raised to the top of the box or casing, the front portion thereof sliding upwardly over the inclined plate 8.

The sides of the box or casing 5 are provided with notches or recesses 25, which are formed therein adjacent to the hinge of the cover 6, and said notches or recesses are adapted to receive a mucilage-brush or the handle thereof, and the operation will be readily understood from the foregoing description when taken in connection with the accompanying drawings and the following statement thereof.

In practice the vessel or receptacle 12 is filled with mucilage through the neck 13, and said vessel or receptacle is then placed on the box or casing 5, as shown in Figs. 1 and 2, in which position the neck 13 passes through the opening 11 in the cross-plate 10, and the mucilage will flow downwardly through the neck 13 into the bottom of the box or casing or into the chamber 26, formed therein, and when the mucilage rises in said chamber to the lower end of the neck 13 the flow of the mucilage will be cut off, as will be readily understood, and the mucilage cannot rise in the chamber 26 above the lower end of the neck 13 and is always kept at a constant level as long as there is any mucilage in the vessel or receptacle 12. Whenever it is desired to use the mucilage, the cover 6 is raised and turned backwardly against the vessel or receptacle 12, as shown in Fig. 1, and at the same time the frame connected with the arms 21 is raised and projected forwardly, as is also shown in said figure, and the brush is dipped into the mucilage at the rear of said frame and the surplus mucilage is removed from the brush on the wires 24, and when the cover 6 is again closed the said frame is again lowered to the bottom of the box or casing 5 and submerged in the mucilage. It will thus be seen that the mucilage cannot dry on the brush-cleaning frame nor on any part thereof, for the reason that when the cover 6 is closed the said frame is submerged in the mucilage. It will also be apparent that the evaporation is reduced to a minimum, as the air cannot enter the box or casing when the cover is closed except through the notches or recesses 25, and these notches or recesses 25 will be substantially closed by the handle of the mucilage-brush. It will also be apparent that my improved mucilage stand or receptacle may be made as ornamental as desired, and it may also be made of any preferred material, and many changes in and modifications of the construction herein described may be made without departing from the spirit of my invention or sacrificing its advantages.

The chamber 14, formed by the partition 9, may be used for any desired purpose, as, for instance, as a receptacle for pens, pins, and other articles, or said partition may be omitted, if desired, in which event the chamber 26 will occupy the entire rear portion of the box or casing 5, and it will also be observed that the cover 6 is provided with a depending flange or rim 27, which fits around that portion of the box or casing 5 over which said cover extends when closed.

Having fully described my invention, I claim as new and desire to secure by Letters Patent—

1. In a mucilage stand or receptacle, the combination with a suitable box or casing provided with a cover which is hinged thereto, centrally thereof, of a mucilage reservoir or vessel mounted in the rear end of said box or casing and provided with a neck which projects downwardly thereinto, said box or casing being provided at its front end with a downwardly and backwardly inclined plate or wall, and beneath the mucilage vessel or receptacle with a vertical partition by which a chamber is formed, which is open at the top, and a brush-cleaning frame mounted in said box or casing and adapted to be operated by the hinged cover, substantially as shown and described.

2. In a mucilage stand or receptacle, the combination with a suitable box or casing, having a cover which is hinged thereto, centrally thereof, of a mucilage reservoir or vessel mounted on the rear end of said box or casing, and provided with a neck which projects downwardly thereinto, said box or casing being provided at its front end with a downwardly and backwardly inclined plate or wall, and said hinged cover being provided with downwardly-directed arms which are pivotally connected with a brush-cleaning frame which when said hinged cover is closed, rests at the bottom of the box or receptacle, and when said cover is raised, is projected forwardly and upwardly over said partition plate or wall, substantially as shown and described.

3. In a mucilage stand or receptacle, the combination with a suitable box or casing, having a cover which is hinged thereto, centrally thereof, of a mucilage reservoir or vessel mounted on the rear end of said box or casing, and provided with a neck which projects downwardly thereinto, said box or casing being provided at its front end with a downwardly and backwardly inclined plate or wall, and said hinged cover being provided with downwardly-directed arms which are pivotally connected with a brush-cleaning frame which when said hinged cover is closed, rests at the bottom of the box or receptacle, and when said cover is raised, is projected forwardly and upwardly over said partition plate or wall, and said brush-cleaning frame being provided with transverse wires by which the surplus mucilage is removed from the brush, and the sides of the box or casing in front of the hinge of the cover being provided with notches or recesses which are adapted to receive the handle of the brush, substantially as shown and described.

In testimony that I claim the foregoing as my invention I have signed my name, in presence of the subscribing witnesses, this 19th day of August, 1896.

CHRISTIAN ALETH BIORN.

Witnesses:
A. ARMSTRONG,
CHARLES S. ROGERS.